United States Patent [19]

Van Broekhoven et al.

[11] Patent Number: 4,859,644
[45] Date of Patent: Aug. 22, 1989

[54] CATALYST COMPOSITIONS AND A PROCESS FOR POLYMERIZING CARBON MONOXIDE AND OLEFINS

[75] Inventors: Johannes A. M. Van Broekhoven; Eit Drent, both of Amsterdam, Netherlands

[73] Assignee: Shell Oil Company, Houston, Tex.

[21] Appl. No.: 212,032

[22] Filed: Jun. 23, 1988

Related U.S. Application Data

[62] Division of Ser. No. 21,947, Mar. 5, 1987, Pat. No. 4,824,935.

[30] Foreign Application Priority Data

Mar. 5, 1986 [NL] Netherlands ............... 8600562

[51] Int. Cl.$^4$ ............... B01J 31/12; B01J 31/04
[52] U.S. Cl. ............... 502/154; 502/162
[58] Field of Search ............... 502/154, 162

[56] References Cited

U.S. PATENT DOCUMENTS

| | | | |
|---|---|---|---|
| 2,495,286 | 1/1950 | Brubaker | 260/63 |
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 3,780,140 | 12/1973 | Hammer | 525/185 |
| 3,835,123 | 9/1974 | Nozaki | 260/94.9 |
| 3,914,391 | 10/1975 | Nozaki | 423/364 |
| 3,984,388 | 10/1976 | Shryne | 260/63 |
| 4,070,532 | 1/1978 | Hammer | 526/11.2 |
| 4,076,911 | 2/1978 | Fenton | 526/11.1 |
| 4,424,317 | 1/1984 | Serres | 525/539 |
| 4,474,978 | 10/1984 | Drent | 560/24 |
| 4,599,476 | 4/1986 | Drent | 585/511 |
| 4,634,793 | 1/1987 | Drent | 560/243 |

FOREIGN PATENT DOCUMENTS

| | | |
|---|---|---|
| 121965 | of 1984 | European Pat. Off. . |
| 181014 | of 1986 | European Pat. Off. . |
| 20469/68 | of 1964 | Japan . |
| 4048406 | of 1969 | Japan . |
| 1081304 | of 1965 | United Kingdom . |
| 2058074 | of 1979 | United Kingdom . |

OTHER PUBLICATIONS

Kirk-Othmer Encyclopedia of Chemical Technology, Second Edition vol. 12, p. 132, 1967.
Encyclopedia of Polymer Science and Technology, 1968, vol. 9, 397–402.
J. Am. Chem. Soc. 1982, 104, 3520-2.
Tetrahedron Lett. 1971, 26, 2409-2412.
Organometallics 1984, 3, 866-870.
Proc. Ind. Assoc. Cult. Sci. 1985, 68B, 1-5.
Chemtech 1986, 1, 48-51.
Adv. Polym. Sci. 1986, 76-4, 125-44.
J. Organomet. Chem. 1985, 279, C5-C10.
Polym. Lett. 1965, 3, 703-7.
Chim. Ind. 1971, 53, 939-40.
J. Mol. Catal. 1983, 18, 117-25.

*Primary Examiner*—Patrick P. Garvin
*Attorney, Agent, or Firm*—Dean F. Vance

[57] ABSTRACT

The invention relates to compositions that may be used as catalysts for the preparation of polymers of carbon monoxide and at least one olefinically unsaturated organic compound. The invention also relates to a process using the catalyst compositions of the invention to prepare said polymers. The process comprises contacting the monomers in the presence of a catalyst obtained from the reaction of (a) a Group VIII metal compound with (b) a bidentate phosphorus, arsenic or antimony ligand, (c) a compound selected from the group consisting of a main group metal salt having an anion of a non-hydrohalogenic acid with a pKa less than 6, and (d) an ether.

30 Claims, No Drawings

CATALYST COMPOSITIONS AND A PROCESS FOR POLYMERIZING CARBON MONOXIDE AND OLEFINS

This is a division of application Ser. No. 021,947, filed Mar. 5, 1987 and now U.S. Pat. No. 4,824,955.

FIELD OF THE INVENTION

This invention relates to a process for the preparation of polymers of carbon monoxide and at least one olefinically unsaturated organic compound. The invention also relates to the catalyst compositions used in the processes of the invention to prepare said polymers.

BACKGROUND OF THE INVENTION

Polymers of carbon monoxide and olefins, such as ethylene, have been known and available in limited quantities for many years. For example, polyketones are disclosed in Kirk-Othmer Encyclopedia of Chemical Technology, Second Edition, Vol. 12, p. 132, 1967, and in Encyclopedia of Polymer Science and Technology, 1968, Vol. 9, 397-402. It is known that polyketones may be prepared by contacting CO and ethylene monomers in the presence of a catalyst. High molecular weight polymers of ethylene which contain small quantities of carbon monoxide can be prepared with the aid of Ziegler catalyst. Low molecular weight polymers of carbon monoxide with ethylene and possibly other olefinically unsaturated hydrocarbons in which all monomer units occur distributed at random within the polymer can be prepared with the aid of radical catalysts such as peroxides. A special class of the polymers of carbon monoxide with ethylene is formed by the high molecular weight linear polymers in which the monomer units occur in alternating order and which polymers consist of units with the formula $-CO-(C_2H_4)-$. Such polymers can be prepared with the aid of, among others, phosphorus-, arsenic-, antimony-, or cyanogen-containing compounds of palladium, cobalt or nickel as catalysts.

High molecular weight linear alternating polymers of carbon monoxide and ethylene consisting of units of the formula $-CO-(C_2H_4)-$, can also be prepared by using catalyst compositions comprising:

(a) a compound of a Group VIII metal selected from the group consisting of palladium, cobalt and nickel, (b) a non-hydrohalogenic acid having a pKa less than 6, and (c) a bidentate ligand of the general formula

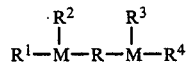

wherein M represents phosphorus, arsenic or antimony, R is a bivalent organic bridging group containing at least two carbon atoms in the bridge and $R^1$, $R^2$, $R^3$ and $R^4$ represent hydrocarbon groups.

Application of these catalyst compositions to a monomer mixture which, in addition to carbon monoxide, comprises for example ethylene and alkenically unsaturated hydrocarbons having the general formula $C_xH_y$ leads to the formation of polynmers with units of the formula $-CO-(C_2H_4)-$ and units of the general formula $-CO-(C_xH_y)-$ occurring randomly distributed throughout the polymer chains. The structures of the copolymers and 'terpolymers' differ only in that in the case of the 'terpolymers' a group $-(C_xH_y)-$ is encountered at random places in the polymer instead of a $-(C_2H_4)-$ group.

When the acid mentioned as component (b) is replaced partly or wholly by a non-noble transition metal salt of the acid concerned catalyst compositions are obtained which possess an attractive activity for the polymerization of carbon monoxide with one or more olefinically unsaturated organic compounds. The activity of the catalyst compositions based on a non-noble transition metal salt or a mixture of a salt and an acid as component (b) can be much enhanced by incorporating a quinone into these compositions.

SUMMARY OF THE INVENTION

By replacing the acid mentioned as component (b) partly or wholly by a main group metal salt of the acid concerned it has now been found that:

(1) Catalyst compositions in which the acid mentioned as component (b) is replaced by a Group 3A-5A metal salt of the acid concerned possess attractive activities for the said polymerization.

(2) Catalyst compositions in which the acid mentioned as component (b) is replaced by an alkali metal salt or an alkaline earth metal salt of the acid concerned possess insufficient activity for the polymerization of carbon monoxide with one or more olefinically unsaturated organic compounds.

(3) The incorporation of an ether as the fourth component into the catalyst compositions containing a main group metal salt considerably enhances their activity for the polymerization of carbon monoxide with one or more olefinically unsaturated organic compounds. Thus the activity of catalyst compositions containing an alkali or an alkaline earth metal salt and displaying insufficient activity per se can be increased to an attractive level. Furthermore, the activity of catalyst compositions which contain a Group 3A-5A metal salt and already possess an attractive activity by nature, is enhanced even further.

The patent application therefore relates to a process for the preparation of polymers of carbon monoxide with at least one olefinically unsaturated organic compound which process comprises contacting carbon monoxide and at least one olefinically unsaturated organic compound in the presence of a catalyst obtained by reacting (1) a compound of a Group VIII metal selected from the group consisting of palladium, cobalt and nickel, (2) a compound selected from the group consisting of main group transition metal salts having an anion of a non-hydrohalogenic acid with a pKa less than 6, a mixture of said salts, and a mixture of said salt and a non-hydrohalogenic acid with a pKa less than 6, (3) a bidentate ligand of the general formula

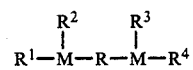

wherein M is selected from the group consisting of phosphorus, arsenic or antimony, R is a bivalent organic bridging group containing at least two carbon atoms in the bridge, $R^1$, $R^2$, $R^3$ and $R^4$ are substituted or unsubstituted hydrocarbon groups, and (4) an ether and under conditions suitable to prepare a linear alternating polymer.

The patent application further relates to catalyst compositions comprising:

(a) a compound of a Group VIII metal selected from the group consisting of palladium, cobalt and nickel, (b) a compound selected from the group consisting of main group metal salts having an anion of a non-hydrohalogenic acid with a pKa less than 6, a mixture of said salts, and a mixture of said salt and a non-hydrohalogenic acid with a pKa less than 6, (c) a bidentate ligand of the general formula

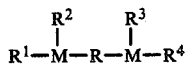

wherein M is selected from the group consisting of phosphorus, arsenic or antimony, R represents a bivalent organic bridging group having at least two carbon atoms in the bridge, $R^1$, $R^2$, $R^3$ and $R^4$ represent substituted or unsubstituted hydrocarbon groups, and (d) an ether.

The patent application further relates to the polymers of carbon monoxide with at least one olefinically unsaturated organic compound thus prepared and to shaped objects which consist at least partly of these polymers.

DETAILED DESCRIPTION OF THE INVENTION

The preferred Group VIII metal compound present in the catalyst composition is a palladium compound. Very suitable are palladium salts of carboxylic acids and in particular palladium acetate. Examples of suitable acids with a pKa of less than 6 (determined in aqueous solution at 18° C.) are sulfuric acid, perchloric acid, sulfonic acids, such as methanesulfonic acid, trifluoromethanesulfonic acid and the para-toluenesulfonic acid and carboxylic acids, such as trichloroacetic acid, difluoroacetic acid, trifluoroacetic acid. Preferred are all acids with a pKa of less than 4, acids with a pKa of less than 2 are even more preferred. The most preference is given to para-toluenesulfonic acid and trifluoroacetic acid. The preferred quantity of the main group metal salt of an acid with a pKa less than 6 or mixture of main group metal salt and acid having a pKa less than 6 present in the catalyst compositions is from 0.5 to 200, and more preferred from 1.0 to 100, equivalents per gram atom of Group VIII metal. If an acid is used in addition to a salt, preference is given to compositions in which the ratio between the number of equivalents of salt and the number of equivalents of acid is higher than 1.

In the present patent application main group metals means all the metals belonging to the main groups 1A–5A. Examples of main group metals whose salts are very suitable for use as component (b) in the catalyst compositions according to the invention are the Group 1A metals lithium, sodium, potassium, rubidium and cesium, the Group 2A metals magnesium, calcium, strontium and barium, the Group 3A metals aluminum, gallium, indium and thallium, the Group 4A metals germanium, tin and lead, and the Group 5A metals antimony and bismuth.

Special preference is given even to the use of salts of the following main group metals: the Group 1A metals lithium, sodium and potassium, the Group 2A metal magnesium, the Group 3A metals aluminum and gallium, the Group 4A metals tin and lead and the Group 5A metal antimony.

In the bidentate ligand, M is preferably phosphorus. The groups $R^1$, $R^2$, $R^3$ and $R^4$ present in the bidentate ligand preferably contain 6 to 14 carbon atoms. Special preference is given to bidentate ligands in which the groups $R^1$, $R^2$, $R^3$ and $R^4$ are aryl groups or alkyl-substituted aryl groups. Even more preferred are phenyl groups and alkyl-substituted phenyl groups. $R^1$, $R^2$, $R^3$ and $R^4$ may be substituted with polar groups. The bivalent organic bridging group R preferably contains three carbon atoms in the bridge. Examples of suitable bidentate ligands are:

1,3-bis(di-p-tolylphosphino)propane
1,3-bis(di-p-methoxyphenylphosphino)propane
1,3-bis(diphenylphosphino)propane, and
2-methyl-2-(methyldiphenylphosphino)-1,3-bis(diphenylphosphino)propane. Preferably either one of the latter two bidentate ligands is used. The bidentate ligand is preferably applied in a quantity of 0.1–5 and in particular of 0.5–1.5 mol per mol of palladium compound.

Both linear and cyclic ethers may be incorporated in the catalyst compositions as the component (d). Both monoethers and polyethers are eligible ethers. An example of a suitable monoether is tetrahydrofuran. Preference is given to the use of polyethers as the component (d). Polyethers that are very suitable for the present purpose are the linear and the cyclic polyalkylene polyethers, in particular those that can be regarded as being derived from ethylene glycol. An example of a very suitable linear polyethylene polyether is tetraglyme, i.e. the dimethyl ether of tetraethylene glycol. Especially preferred is the use of cyclic polyethylene polyethers (crown ether) as the component (d). 12 crown 4, 15 crown 5 and 18 crown 6 have been found to be very suitable crown ethers. (In the description x crown y that is used here, x refers to the total number of atoms present in the ring and y to the number of oxygen atoms present in the ring).

The preferred quantity of ether used is 0.5–10000 and in particular 1–5000 mol per gram atom of main group metal.

The polymerization using the catalyst compositions according to the invention is preferably carried out in a liquid diluent. Very suitable liquid diluents are lower alcohols such as methanol and ethanol.

Eligible olefinically unsaturated organic compounds that can be polymerized with carbon monoxide with the aid of the catalyst compositions according to the invention are both compounds which consist exclusively of carbon and hydrogen and compounds which, in addition to carbon and hydrogen, contain one or more hetero-atoms. By preference the catalyst compositions according to the invention are used to prepare polymers of carbon monoxide with one or more olefinically unsaturated hydrocarbons. Examples of suitable hydrocarbon monomers are ethylene and other α-olefins, such as propylene, butene-1, hexene-1 and octene-1 as well as styrene and alkyl-substituted styrenes, such as p-methyl styrene and p-ethyl styrene. The catalyst compositions according to the invention are especially suitable for use in the preparation of copolymers of carbon monoxide with ethylene and in the preparation of terpolymers of carbon monoxide with ethylene and with an other olefinically unsaturated hydrocarbon, in particular propylene.

The quantity of catalyst composition applied in the preparation of the polymers may vary within wide ranges. Per mol of olefinically unsaturated compound to be polymerized, a quantity of catalyst is used which preferably contains $10^{-7}$–$10^{-3}$ and in particular $10^{-6}$–$10^{-4}$ gram atom of palladium.

Preferably, the preparation of the polymer is carried out at a temperature of 20°–200° C. and a pressure of 1–200 bar and in particular at a temperature of 30°–150° C. and a pressure of 20–100 bar. In the mixture to be polymerized the molar ratio of the olefinically unsaturated organic compounds relative to carbon monoxide preferably is 10:1–1:5 and in particular 5:1–1:2. The carbon monoxide used in the preparation of the polymers according to the invention need not be pure. It may contain such contaminations as hydrogen, carbon dioxide and nitrogen.

The polymers according to the invention have good mechanical properties. They can be processed by means of the usual techniques into, among other things, films, sheets, plates, fibers and molded objects. The low molecular weight polymers in particular may be used as intermediates for the production of plastics, as components in blends with other polymers (such as waxes and greases) and as plasticizers for other polymers. The higher molecular weight polymers have use and utility as premium thermoplastics for fibers, films, injection molding, compression molding or blowing applications. On account of their properties, the higher molecular weight polymers according to the invention are suitable for many applications, such as in the auto industry, for the manufacture of packaging material for the foods and drinks, as constructional and building material, for the manufacture of cables and for a variety of applications in the domestic sphere. In order to modify the characteristics or to strengthen them, the polymers according to the invention can be employed in combination with many other sorts of materials.

The invention will be illustrated with the aid of the following examples.

EXAMPLE 1

A magnetically stirred autoclave of 250 ml capacity was charged with a catalyst solution consisting of:
50 ml of methanol
0.1 mmol of palladium acetate,
0.15 mmol of 1,3-bis(diphenylphosphino)propane
1 mmol of potassium para-tosylate.

Carbon monoxide was introduced into the autoclave until a pressure of 30 bar was reached and then ethylene until a pressure of 60 bar was reached. Finally, the autoclave was heated to 80° C. After 5 hours the autoclave was cooled down to room temperature and then the pressure was released. No more than a trace of polymer material was obtained.

EXAMPLE 2

This example was executed in substantially the same manner as Example 1, except that now the catalyst solution contained 10 mmol of 1,4-benzoquinone in addition. Again no more than a trace of polymer material was obtained.

EXAMPLE 3

A carbon monoxide/ethylene copolymer was prepared by substantially repeating Example 1, but with the following differences:
(a) the catalyst solution in addition contained 10 mmol of 18 crown 6,
(b) the reaction time was 4 hours, and
(c) after the pressure had been released the polymer formed was filtered off, washed with methanol and dried in vacuo at room temperature.

The yield was 13 g of copolymer, so the polymerization rate was 325 g of copolymer/g of palladium/hour.

EXAMPLE 4

A carbon monoxide/ethylene copolymer was prepared in substantially the same manner as the copolymer of Example 3, the differences being that
(a) the catalyst solution contained 10 mmol of tetraglyme instead of 2 mmol of 18 crown 6, and
(b) the reaction time was 5 hours.

The yield was 9.5 g of copolymer, so the polymerization rate was 190 g of copolymer/g of palladium/hour.

EXAMPLE 5

A carbon monoxide/ethylene copolymer was prepared in substantially the same manner as the copolymer of Example 3, the differences being that
(a) the catalyst solution contained 100 mmol of tetraglyme instead of 2 mmol of 18 crown 6, and
(b) the reaction time was 5 hours.

The yield was 20 g of copolymer, so the polymerization rate was 400 g of copolymer/g of palladium/hour.

EXAMPLE 6

A carbon nonoxide/ethylene copolymer was prepared in substantially the same manner as the copolymer of Example 3, the differences being that
(a) the catalyst solution contained 20 ml of tetrahydrofuran instead of 2 mmol of 18 crown 6, and
(b) the reaction time was 5 hours.

The yield was 13 g of copolymer, so the polymerization rate was 260 g of copolymer/g of palladium/hour.

EXAMPLE 7

A carbon monoxide/ethylene copolymer was prepared in substantially the same manner as the copolymer of Example 3, the differences being that
(a) the catalyst solution contained no 18 crown 6, and 1 mmol of tin sulphate instead of 1 mmol of potassium para-tosylate, and
(b) the reaction time was 1 hour.

The yield was 5 g of copolymer, so the polymerization rate was 500 g of copolymer/g of palladium/hour.

EXAMPLE 8

A carbon monoxide/ethylene copolymer was prepared in substantially the same manner as the copolymer of Example 3, the differences being that
(a) the catalyst solution contained 1 mmol of tin sulfate instead of 1 mmol of potassium para-tosylate and 1 mmol of 15 crown 5 instead of 2 mmol of 18 crown 6, and
(b) the reaction time was 1.5 hour.

The yield was 15 g of copolymer, so the polymerization rate was 1000 g of copolymer/g of palladium/hour.

EXAMPLE 9

A carbon monoxide/ethylene copolymer was prepared in substantially the same manner as the copolymer of Example 3, the differences being that
(a) the catalyst solution contained no 18 crown 6, and 2 mmol of tin sulfate instead of 1 mmol of potassium para-tosylate, and
(b) the reaction time was 1 hour.

The yield was 15 g of copolymer, so the polymerization rate was 1500 g of copolymer/g of palladium/hour.

EXAMPLE 10

A carbon monoxide/ethylene copolymer was prepared in substantially the same manner as the copolymer of Example 3, the differences being that (a) the catalyst solution contained 10 mmol of 1,4-benzoquinone instead of 2 mmol of 18 crown 6, and 1 mmol of tin sulfate instead of 1 mmol of potassium para-tosylate, and (b) the reaction time was 1 hour.

The yield was 5 g of copolymer, so the polymerization rate was 500 g of copolymer/g of palladium/hour.

EXAMPLE 11

A carbon monoxide/ethylene copolymer was prepared in substantially the same manner as the copolymer of Example 3, the differences being that (a) the catalyst solution contained no 18 crown 6, and 2 mmol of aluminum sulfate instead of 1 mmol of potassium para-tosylate, and (b) the reaction time was 1 hour.

The yield was 18 g of copolymer, so the polymerization rate was 1800 g of copolymer/g of palladium/hour.

EXAMPLE 12

This example was carried out in substantially the same manner as Example 1, except that now the catalyst solution contained 1 mmol of lithium para-tosylate instead of 1 mmol of potassium para-tosylate. This example, too, yields no more than a trace of polymer material.

EXAMPLE 13

A carbon monoxide/ethylene copolymer was prepared in substantially the same manner as the copolymer of Example 3, the differences being that (a) the catalyst solution contained 3 mmol of 12 crown 4 instead of 2 mmol 18 crown 6, and 1 mmol of lithium para-tosylate instead of 1 mmol of potassium para-tosylate, and (b) the reaction time was 5 hours.

The yield was 15 g of copolymer, so the polymerization rate was 300 g of copolymer/g of palladium/hour.

EXAMPLE 14

A carbon monoxide/ethylene copolymer was prepared in substantially the same manner as the copolymer of Example 3, the differences being that (a) the catalyst solution contained no 18 crown 6, and 2 mmol of magnesium sulfate instead of 1 mmol of potassium para-tosylate, and (b) the reaction time was 5 hours.

The yield was 3.5 g of copolymer, so the polymerization rate was 70 g of copolymer/g of palladium/hour.

EXAMPLE 15

A carbon monoxide/ethylene copolymer was prepared in substantially the same manner as the copolymer of Example 3, the differences being that (a) the catalyst solution contained 100 mmol of tetraglyme instead of 2 mmol of 18 crown 6, and 2 mmol of magnesium sulfate instead of 1 mmol of potassium para-tosylate, and (b) the reaction time was 5 hours.

The yield was 6 g of copolymer, so the polymerization rate was 320 g of copolymer/g of palladium/hour.

EXAMPLE 16

A carbon monoxide/ethylene copolymer was prepared in substantially the same manner as the copolymer of Example 3, the differences being that (a) the catalyst solution contained no 18 crown 6, and 2 mmol of antimony sulfate instead of 1 mmol of potassium para-tosylate, (b) the reaction temperature was 55° C., and (c) the reaction time was 5 hours.

The yield was 17.5 g of copolymer, so the polymerization rate was 350 g of copolymer/g of palladium/hour.

EXAMPLE 17

A carbon monoxide/ethylene copolymer was prepared in substantially the same manner as the copolymer of Example 3, the differences being that (a) the catalyst solution contained 2 mmol of antimony sulfate instead of 1 mmol potassium para-tosylate, and 100 ml of tetraglyme instead of 2 mmol of 18 crown 6, (b) the reaction temperature was 55° C., and (c) the reaction time was 3 hours.

The yield was 18 g of copolymer, so the polymerization rate was 600 g of copolymer/g of palladium/hour.

Of the polymers prepared according to Examples 3–11 and 13–17, the polymers prepared according to Examples 3–11, 13 and 15–17 are polymers according to the invention. In the preparation of these polymers use was made of catalyst compositions according to the invention containing a main group salt, either with or without an ether, on the understanding that when an alkali or alkaline earth metal salt is used, an ether will invariably be used as well. Examples 1, 2, 12 and 14 fall outside the scope of the invention and have been included in the patent application for comparison.

The results of Examples 1, 12 and 14 show the inadequacy of the activities of catalyst compositions containing an alkali(ne earth) metal salt as the main group salt, and in which no ether is incorporated.

Comparison of the results of Examples 1 and 7 with those of Examples 2 and 10, respectively shows that the incorporation of a quinone in the catalyst compositions containing a main group metal salt does not lead to enhanced activity.

Comparison of the results of Examples 3–6, 13 and 15 shows that the activities of catalyst compositions containing a Group 1A of 2A metal salt, which compositions as such possess insufficient activities, are raised to an attractive level by the incorporation of an ether into these compositions.

The results of Examples 7–9, 11, 16 and 17 show that catalyst compositions containing a Group 3A–5A metal salt have attractive activities themselves, which can be enhanced still further by the incorporation of an ether into these compositions.

All of the carbon monoxide/ethylene copolymers prepared according to Examples 3–11 and 13–17 had melting points of 257° C. With the aid of $^{13}$C-NMR analysis it was established that these polymers had a linear alternating structure and thus consisted of units of the formula $-CO-(C_2H_4)-$.

What is claimed is:

1. A catalyst composition which comprises
   (a) a compound of a Group VIII metal selected from the group consisting of palladium, cobalt and nickel, (b) at least one compound selected from the group consisting of metal salts having an anion of a non-hydrohalogenic acid with a pKa less than 6,
(c) a bidentate ligand of the general formula

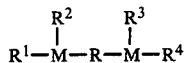

wherein M is selected from the group consisting of phosphorus, arsenic or antimony, R is a bivalent organic bridging group containing at least two carbon atoms in the bridge and $R^1$, $R^2$, $R^3$ and $R^4$ are alkyl substituted, alkoxy substituted or unsubstituted hydrocarbon groups, and
(d) an ether.

2. The composition of claim 1 wherein the Group VIII metal compound is a palladium compound.

3. The composition of claim 1 wherein the Group VIII metal compound is a palladium salt of a carboxylic acid.

4. The composition of claim 1 wherein the Group VIII metal compound is palladium acetate.

5. The composition of claim 1 wherein the non-hydrohalogenic acid with a pKa less than 6 is an acid selected from the group consisting of sulfonic acids with a pKa of less than 2 and carboxylic acids with a pKa of less than 2.

6. The composition of claim 1 wherein the non-hydrohalogenic acid having a pKa less than 6 is an acid selected from the group consisting of para-toluenesulfonic acid and trifluoroacetic acid.

7. The composition of claim 1 wherein Group 1A–5A metal is selected from the group consisting of lithium, sodium, potassium, magnesium, aluminum, gallium, tin, lead, and antimony.

8. The composition of claim 1 wherein Group 1A–5A metal salt is a mixture of Group 1A–5A metal salt having an anion of a non-hydrohalogenic acid with a pKa less than 6 and non-hydrohalogenic acid with a pKa less than 6.

9. The composition of claim 8 wherein Group 1A–5A metal salt and non-hydrohalogenic acid are in a ratio greater than 1 between the number of equivalents of salt and the number of equivalents of acid.

10. The composition of claim 1 wherein M is phosphorus.

11. The composition of claim 1 wherein the divalent organic bridging group R contains three carbon atoms in the bridge.

12. The composition of claim 1 wherein the hydrocarbon groups $R^1$, $R^2$, $R^3$, and $R^4$ each contain 6 to 14 carbon atoms.

13. The composition of claim 1 wherein the hydrocarbon groups $R^1$, $R^2$, $R^3$, and $R^4$ each contain an aryl group bonded directly to M.

14. The composition of claim 1 wherein the hydrocarbon groups $R^1$, $R^2$, $R^3$, and $R^4$ are selected from the group consisting of phenyl groups and alkyl-substituted phenyl groups.

15. The composition of claim 1 wherein the bidentate ligand is selected from the group consisting of 1,3-bis(-diphenylphosphino)propane, 1,3-bis(di-p-methoxyphenylphosphino)propane, 1,3-bis(di-p-tolylphosphino)propane, and 2-methyl-2-(methyldiphenylphosphino)-1,3-bis(diphenylphosphino)-propane.

16. The composition of claim 1 wherein the ether is a polyether.

17. The composition of claim 16 wherein the polyether is selected from the group consisting of linear polyalkylene polyethers and cyclic polyalkylene polyethers.

18. The composition of claim 16 wherein the polyether is a linear polyethylene polyether.

19. The composition of claim 18 wherein the linear polyethylene polyether is tetraglyme.

20. The composition of claim 16 wherein the polyether is a cyclic polyethylene polyether.

21. The composition of claim 3 wherein the non-hydrohalogenic acid with a pKa less than 6 is an acid selected from the group consisting of sulfonic acids with a pKa of less than 2 and carboxylic acids with a pKa of less than 2.

22. The composition of claim 21 wherein M is phosphorus.

23. The composition of claim 22 wherein the bivalent organic bridging group R contains three carbon atoms.

24. The composition of claim 23 wherein the hydrocarbon groups $R^1$, $R^2$, $R^3$, and $R^4$ each contain an aryl group bonded directly to M.

25. The composition of claim 24 wherein the bidentate ligand is selected from the group consisting of 1,3-bis(diphenylphosphino)-propane, 1,3-bis(di-p-methoxyphenylphosphino)propane, 1,3-bis(di-p-tolylphosphino)propane, and 2-methyl-2-(methyldiphenylphosphino)-1,3-bis(diphenylphosphino)-propane.

26. The composition of claim 24 wherein the ether is a polyether.

27. The composition of claim 26 wherein the polyether is selected from the group consisting of linear polyalkylene polyethers and cyclic polyalkylene polyethers.

28. The composition of claim 1 wherein said groups $R^1$, $R^2$, $R^3$ or $R^4$ are alkyl-substituted hydrocarbon groups.

29. The composition of claim 1 where said groups $R^1$, $R^2$, $R^3$ or $R^4$ are alkoxy-substituted hydrocarbon groups.

30. The composition of clam 29 wherein said alkoxy-substituted hydrocarbon groups are methoxy-substituted phenyl groups.

* * * * *